May 30, 1967  H. D. BAUMANN  3,322,142
VALVE FOR LOW TEMPERATURE SERVICE
Filed Aug. 25, 1964
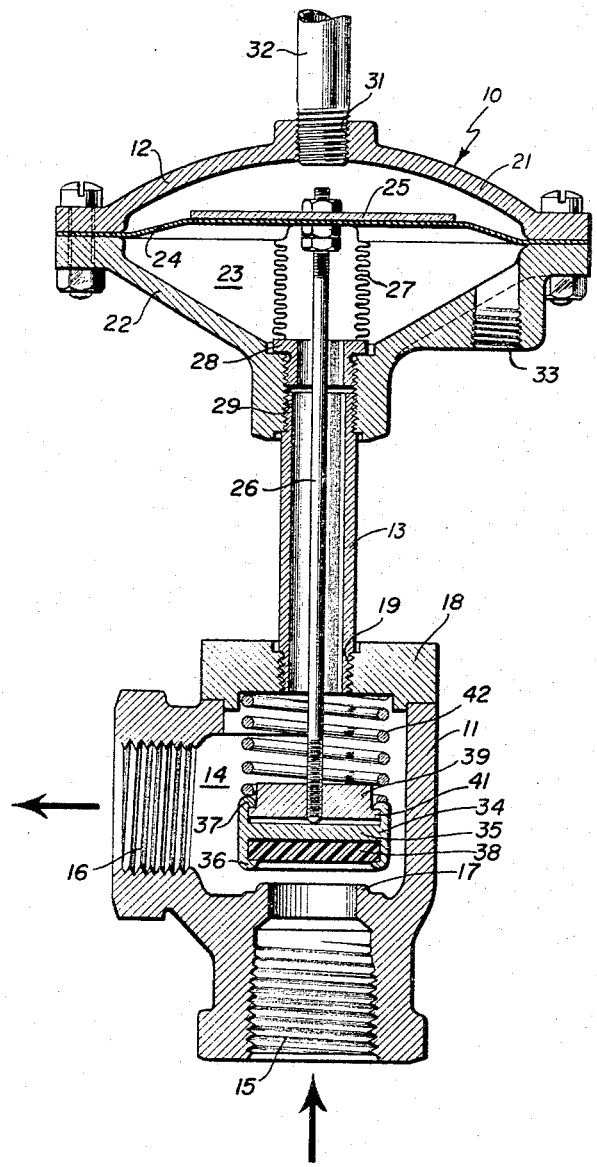
HANS D. BAUMANN
INVENTOR.
BY
Norman S. Blodgett

United States Patent Office 3,322,142
Patented May 30, 1967

3,322,142
VALVE FOR LOW TEMPERATURE SERVICE
Hans D. Baumann, Decatur, Ill., assignor to A. W. Cash Company, Decatur, Ill., a corporation of Illinois
Filed Aug. 25, 1964, Ser. No. 391,965
4 Claims. (Cl. 137—334)

This invention relates to a valve and, more particularly, to apparatus arranged to regulate the pressure characteristics of an enclosed body of fluid or gas.

In the storage and handling of large bodies of fluid or gas, it is common practice to provide the system with a relief valve to prevent the pressure from exceeding a predetermined value. In the case of liquid gases, this valve must be constructed so as to be operative at very low temperatures, particularly because of the fact that, when such liquid gases are relieved, the flashing from the liquid to a gas results in considerable absorption of heat from surrounding elements and in the reduction of the temperature of the valve to very low temperature. Valves of this type in the past have suffered from a number of disabilities, much of which can be traced to the fact that the operating elements consist of sliding surfaces which easily become fouled with ice and, in some cases, freeze together so that the valve is not operative. Difficulty has been experienced with prior art valves in cold service because the sealing bellows became very brittle at low temperature and failure resulted. These and other difficulties experienced with the prior art devices have been obviated in a novel manner by the present invention.

It is, therefore, an outstanding object of the invention to provide a valve capable of operating effectively at very low temperatures.

Another object of this invention is the provision of a valve for relieving pressure in the storage of liquid gases.

A further object of the present invention is the provision of a diaphragm-operated relief valve in which the moving elements of the valve are not affected by low temperature or by the accumulation of ice.

It is another object of the instant invention to provide a valve for use in very cold service, wherein the sealing elements are protected from the low temperature and, therefore, do not become brittle.

It is a further object of the present invention to provide a relief valve for use in the storage of liquid gases, wherein the operative elements are simple in construction and are not easily rendered ineffective by accumulation of ice and the like.

A still further object of this invention is the provision of a relief valve for use in the storage of liquid gases which valve is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawing in which:

The single figure shows a valve embodying the principles of the present invention.

The valve, indicated generally by the reference numeral 10, is shown as consisting of a main body 11 and a control body 12 joined by an elongated, thin-walled tube 13. The main body 11 has a hollow interior defining a chamber 14 and is provided with an inlet port 15 which is threaded and an outlet port 16 which is also threaded. Facing upwardly in the body 11 and concentric with the inlet port 15 is a valve seat 17. The housing 11 opposite the valve seat 17 is provided with a bonnet 18 having a threaded valve stem opening 19 in which is threadedly mounted one end of the tube 13. The tube 13 is formed of a low heat-conductive material such as stainless steel.

The control body 12 is formed with an upper portion 21 and a lower portion 22 which are bolted together to define a chamber 23 in the general shape of an oblate spheroid. Dividing the chamber 23 into an upper and a lower part and having its periphery clamped between the upper portion 21 and the lower portion 22 of the housing is a circular diaphragm 24 formed of a flexible material, such as Buna-N. Lying against the upper surface of the diaphragm 24 in a central portion thereof is a diaphragm plate 25. To the center of the diphragm 24 and the diaphragm plate 25 is bolted one end of a valve stem 26. The valve stem is formed from a material of low conductivity, such as stainless steel. Fastened to the underside of the diaphragm 24 is one end of a metal bellows 27, the other end of which is fastened to a plug 28 which is threadedly mounted in a threaded valve stem opening 29. Also threaded into the opening 29 is the upper end of the tube 13.

The upper part of the chamber 23 (above the diaphragm 24) is provided with a threaded control opening 31 in which is threadedly mounted a conduit 32 leading to a venting area. The lower portion 22 of the control housing 12 is provided with a bias air opening 33 which is connected to a source of bias pressure air, not shown.

The valve stem 26 has its upper end lying in the chamber 23 of the housing 12 and bolted to the diaphragm 24. It extends downwardly concentrically of the tube 13 through the valve stem opening 19 into the chamber 14 of the housing 11. Its lower end is located above the valve seat 17. Also located above the valve seat is a seat-contacting member 34 consisting of a metal disc 35 having a first peripheral flange 36 extending downwardly toward the valve seat 17 and a second peripheral flange 37 extending upwardly. The flange 36 embraces a disc 38 which is formed of an elastomer, such as Teflon. After the disc 38 has been inserted, the flange 36 is swaged over to hold it tightly in place. The second flange 37 embraces a circular plate 39 having a radially-extending flange 41 over which the secondary flange 37 is beaded to hold the plate in place. The beading of the second flange 37 is such that the plate 39 is free to move a slight amount relative to the metal disc 35 and the lower end of the valve stem 26 is screwed to the center of this disc. The lower end of the stem 26 is provided with a spherical surface which contacts the upper surface of the member 34, so that the member 34 and the disc 38 are free to rock to compensate for misalignment with the valve seat 17. Finally, a coil spring 42 resides in the chamber 14 with one end pressed against the bonnet 18 concentrically of the valve stem 26 and the valve stem opening 19; the other end of the spring presses against the top of the seat-contacting member 34 to bias it toward the valve seat 17.

The operation of the invention will now be readily understood in view of the above description. The inlet port 15 is connected by usual means to a container in which is stored a liquid gas, such as liquid ammonia. The outlet port 16 is connected in the usual way to the exterior of a building or an area of disposal. The spring 42 biases the seat-contacting member 34 toward the valve seat 17 so that the elastomer disc 38 presses against the annular surface of the valve seat and prevents the escape of liquid or gas through the valve under normal conditions. Ordinarily, there will be no air pressures on the diaphragm 24 either through the opening 33 or through the opening 31; any air escaping around the diaphragm 24 will be vented through the opening 31. The pressure of the spring 42 maintains the disc 36 in contact with the valve seat. The arrival of a signal pressure at the port 33 will operate on the diaphragm 24 to cause the seat-contacting member 34 to move upwardly and to release gas in the storage container. In the case of a liquid gas, the release of expanded gas in this way through the valve lowers the temperature very rapidly. All of the elements contained in the housing 11 become very cold. If, as is usually the case, there is a certain amount of humidity in the atmosphere contained in the chamber 14, ice will form on all of the elements. This low temperature, however, is not felt at the other end of the apparatus in the housing 12 because of the low heat-transfer rate through the tube 13 and through the valve stem 26. Therefore, the diaphragm 24 and the bellows 27 are usually not subjected to this cold temperature but, if they are, to a much lesser degree. They are not caused to become cold and stiff and, therefore, during the most important action of the valve, are not ruptured or rendered ineffective in any way. The bellows 27, of course, prevents the escape of any gas around the valve stem 26, while permitting freedom of movement.

It can be seen that the lower end of the valve stem 26 and the seat-contacting member 34 to which it is fastened, are supported in the housing 12 only by the spring 42. Since this spring is not subject to being rendered ineffective by accumulation of ice and so on, it makes a very adequate support for the valve stem and the valve stem is free to adjust itself to the valve seat 17 and to be moved up and down toward and away from the valve seat without any inhibition due to the formation of ice and the like. It should be noted that the movable suspension of the valve stem 26 (because of the fact that its upper end is bolted to the diaphragm 24 and its lower end is supported only by the coil spring 42) means that the valve stem and the seat-engaging member 34 can adjust themselves to make perfect contact with the valve seat, despite thermal distortions and the like which may take place because of extreme changes of temperature. During the filling of the storage tank with liquid nitrogen, a pressure is admitted to the underside of the diaphragm 24 through the opening 33 and this lifts the valve and permits the gaseous nitrogen blanket to escape from the tank. This actuating pressure is, of course, separated from the valve downstream pressure by the bellows 27. The fact that the bellows is located in the control housing 12 prevents freeze-up, since the valve housing 11 can reach a temperature as low as −320° F. The valve stem 26 is formed of a Type 316 stainless steel while the tube 13 is formed of a Type 304 stainless steel, both being low in thermal conductivity to isolate the control housing 12 and its included elements from the cold temperature in the main body 11 of the valve.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A valve, comprising
   (a) a main housing having a chamber with inlet and outlet ports and with a valve seat, the housing having a valve stem opening,
   (b) a control housing having a chamber with a diaphragm with a regulating port entering the chamber on one side of the diaphragm and with a valve stem opening on one side of the diaphragm,
   (c) an elongated valve stem having one end connected to the diaphragm, extending through the valve stem opening of the control housing and through the valve stem opening of the main housing, and having its other end located adjacent the valve seat,
   (d) an elongated tube of low-heat transfer material joining the valve stem openings of the housings and surrounding the valve stem,
   (e) a coil spring lying in the chamber of the main housing concentrically of the valve stem and having one end pressing against the inner surface of the main housing concentrically of the valve stem opening, and
   (f) a seat-contacting member attached to the said other end of the valve stem, the other end of the coil spring pressing against the seat-contacting member, the valve stem being supported only by the diaphragm in the control housing and by the coil spring in the main housing.

2. A valve, comprising
   (a) a main housing having a chamber with inlet and outlet ports and with a valve seat, the housing having a valve stem opening,
   (b) a control housing having a chamber with a diaphragm with a regulating port entering the chamber on one side of the diaphragm and with a valve stem opening on one side of the diaphragm,
   (c) an elongated valve stem having one end connected to the diaphragm, extending through the valve stem opening of the control housing and through the valve stem opening of the main housing, and having its other end located adjacent the valve seat,
   (d) an elongated tube of low-heat transfer material joining the valve stem openings of the housings and surrounding the valve stem,
   (e) and a bellows lying in the chamber of the control housing, surrounding the valve stem, connected at one end to the diaphragm and connected at the other end to the housing around the valve stem opening.

3. A valve as recited in claim 2, wherein the tube is thin-walled and is formed of stainless steel.

4. A valve as recited in claim 2, wherein the seat-contacting member is a disc-like element having a first peripheral flange extending axially toward the valve seat and a second peripheral flange extending away from the valve seat, wherein the first flange embraces an elastomer disc which contacts the valve seat on occasion, and wherein the second flange embraces a metal disc which is connected to the said other end of the valve stem.

References Cited
UNITED STATES PATENTS

| | | | |
|---|---|---|---|
| 545,083 | 8/1895 | Locke | 251—61 |
| 2,209,709 | 7/1940 | Weatherhead | 251—368 X |
| 2,479,688 | 8/1949 | Lindgren | 251—86 |
| 2,499,527 | 3/1950 | Raymond | 251—335.2 X |
| 2,871,870 | 2/1959 | Peters | 251—61.1 X |
| 2,925,987 | 2/1960 | Priesmeyer | 251—61 |
| 3,092,070 | 6/1963 | Wright | 251—61 |

M. CARY NELSON, *Primary Examiner.*

ARNOLD ROSENTHAL, *Examiner.*